April 14, 1942.  F. E. JOHNSON  2,279,903
NUT MEMBER
Filed May 29, 1940
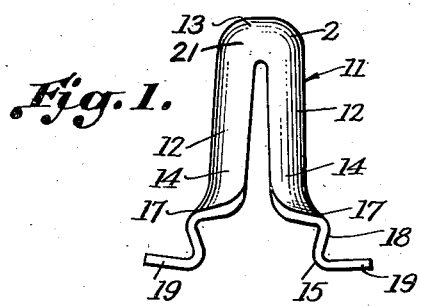
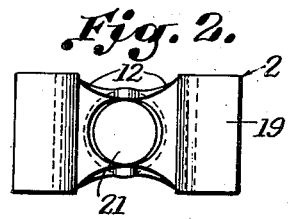
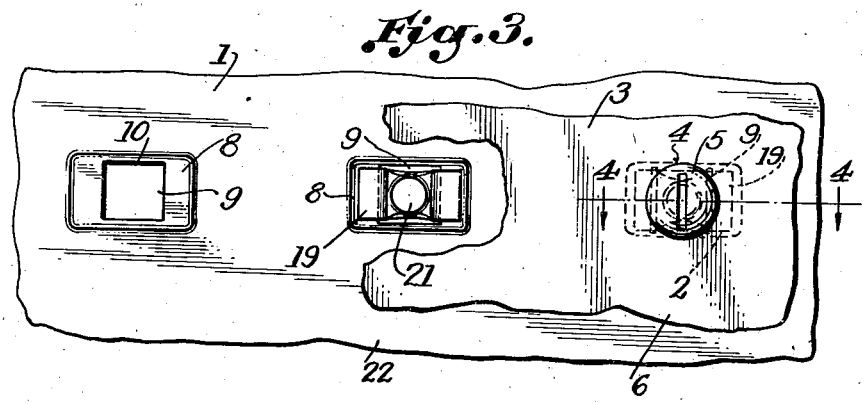
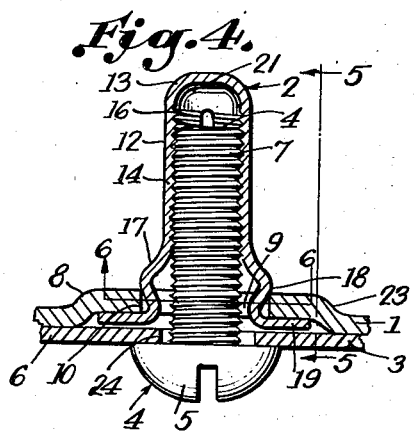
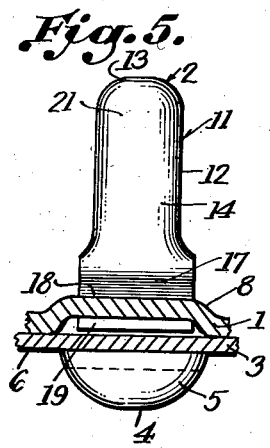
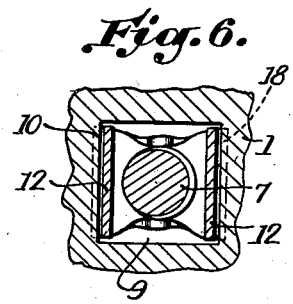
Inventor,
FRANK E. JOHNSON.
BY John Todd
ATT'Y.

Patented Apr. 14, 1942

2,279,903

UNITED STATES PATENT OFFICE 2,279,903

NUT MEMBER

Frank E. Johnson, Malden, Mass., assignor to United-Carr Fastener Corporation, Cambridge, Mass., a corporation of Massachusetts Application May 29, 1940, Serial No. 337,809

6 Claims. (Cl. 85—32)

This invention relates to improvements in nut members of the type adapted to be snapped through an opening in a supporting plate, and more particularly where there is access to only one side of the plate, so as to be firmly assembled with the plate.

One of the improvements which my present invention effects over other known devices is found in the shoulder portions of the same wherein they are formed to provide a wider bearing surface to abut a support adjacent the nut-receiving opening. One advantage of this substantially more rigid construction is the improved resistance of the shoulders against their tendency to spread out or be deformed as a result of pressure against the support when the nut is tightened down.

Another feature of my present invention results from its improved construction wherein I have provided a cup-shaped portion of substantially semi-spherical shape at the bottom end of the nut shank which serves to stiffen the legs thereby increasing the resiliency of the same. Also, provision of the cup-shaped portion is an advantage in the manufacture of the nut, as hereinafter described.

Other objects and purposes of my invention will be apparent from inspection of the drawing and specification hereinbelow set forth.

Referring to the drawing, in which I have illustrated a preferred embodiment of my invention:

Fig. 1 is a side elevation of my improved nut member per se;

Fig. 2 is a top view of the nut member shown in Fig. 1;

Fig. 3 is a plan view of parts of an installation illustrating, reading from left to right, the aperture of a support, a nut member assembled with the support through the aperture, and another part secured to the support by a screw engaged with the nut;

Fig. 4 is an enlarged section taken on the line 4—4 of Fig. 3;

Fig. 5 is a section taken on the line 5—5 of Fig. 4;

Fig. 6 is a section taken along the line 6—6 of Fig. 4; and

Fig. 7 is a view showing the nut blank prior to its completion.

Referring to Figs. 3-6 of the drawing, I have shown a preferred nut installation comprising a supporting structure in the form of a metal plate 1. My improved nut member 2 is assembled with the plate 1 and another part such as the panel 3 is secured in superposed relation to the plate 1 through means of a screw 4 having a head 5 engaging the outer surface 6 of the plate 3 and a shank 7 in threaded engagement with the nut 2. The plate 1 has an embossed portion 8 in which is formed an opening 9. The opening 9 is preferably square in shape to facilitate rapid assembly of the nut with the support and has marginal side edges 10.

Referring in detail to my improved nut member 2, I have shown one which is formed from sheet metal material. I prefer to make the nut of brass as the non-corrosive qualities of this material make it desirable in many installations, but the nut may also be made from steel. The nut member 2 has a U-shaped shank 11 comprising a pair of opposed yieldable legs 12—12 connected at the bottom end 13 of the shank. Each of the legs 12—12 has a portion 14 extending from the bottom end 13 a predetermined distance toward the top end 15, which is of bowed shape in its transverse cross-section, whereby the portions 14 cooperate to provide a substantially circular screw-receiving seat. Each of the portions 14 has threads 16 on its inner surface adapted for threaded engagement with the shank 7 of the screw member. Camming portions 17 form continuations of the bowed portions 14 and extend outwardly from the bowed portions and upwardly toward the top end of the nut. Shoulder portions 18 extend inwardly from the outer ends of the camming portion 17 and flange portions 19 extend outwardly from the ends of the shoulder portion. The flange portions 19 are disposed in a plane spaced from the shoulders 18 to enable the support 1 to be received between them. It will be seen from inspection of Fig. 7, which illustrates the nut blank in partial completion, that the nut is formed by folding a rectangular strip 20 intermediate its ends. One feature of my invention is found in the particular construction of the shoulder portions 18, each of which extends transverse to the axis of the shank across the entire width of its respective leg, as most clearly shown in Figs. 5 and 6. Also, it will be seen that the shoulders 18 are straight in cross-section. As a result of this construction the shoulders 18 bear upon the material adjacent opposed edges 10 of the aperture 9 for the entire lengths of the respective edges (Fig. 6). Thus the relatively great bearing surface which the shoulders 18 provide assures resistance by the shoulders against the tendency thereof to become deformed when the shank is moved axially of the nut member in the direction of the screw head during tightening down of the parts.

A further advantage is effected by the wide bearing surfaces of the shoulders when the nut is applied to refrigerator and the like installations in which the supporting panel has a porcelain finish on opposite sides to prevent rust. Thus the wider bearing surfaces distribute the tightening forces of the nut over a wider area of the porcelain finish adjacent the nut-receiving opening with the result that there is less tendency for the porcelain to chip that when the tightening forces of the nut are concentrated over a small area of porcelain, as with the narrower ear-shaped projections illustrated by my above-mentioned application.

Another feature of my invention is found in the particular construction of the bottom end 13 of the nut member, to which end I have provided a cup-shaped portion 21 (Figs. 1, 2, 4 and 5) of preferably substantially semi-spherical shape. The cup-shaped portion 21 stiffens the connection between the legs 12—12 and thus increases substantially the resiliency of the legs 12—12. This increased resiliency benefits greatly the successful operation of the nut member, particularly when the nut member is made from brass material which does not have a great deal of inherent resiliency. Also, by providing the cup-shaped portion 21 at the bottom end of the nut, it is not necessary to lessen the width of the blank 20 adjacent the ends of the line of fold. This narrowing of the stock would be necessary if the cup-shaped portion 21 were not provided due to the tendency of the bolt strip to spread too far outwardly adjacent the ends of the line of fold when the strip is folded transversely intermediate its ends.

Assembly of the nut member 2 with the plate 1 is a very simple matter and may be carried out entirely from a position outside the outer surface 22 of the plate 1. Thus the bottom end 13 of the nut member is inserted through the aperture 9 of the plate 1 until the camming surfaces 17—17 engage the inner surface 23 of the plate 1 adjacent the aperture 9. Next pressure is exerted upon the flanges 19—19 so as to force the camming portions 17—17 through the aperture. During this action the legs 12—12 are cammed toward each other with the result that after the camming portions have passed through the aperture, the legs 12—12 expand, through reason of resiliency set up by the cup-shaped portion 21 of the bottom end 13, so as to dispose the shoulders 18—18 behind the inner surface 23 (Fig. 4) of the plate 1. The plate member 3 is now superposed on the surface 22 (Fig. 3) of the plate 1 with an aperture 24 of the plate 3 in alignment with the bolt-receiving shank of the nut. Finally the shank 7 of the bolt is extended through the aligned apertures of the plates 1 and 3 into threaded engagement with the threaded portions 16 of the nut. As the bolt is threaded into the nut, the shoulders 18 are drawn against the inner surface 23 of the plate 1 adjacent the aperture 9 thus providing a secure and efficient fastener device.

As a result of my invention I have provided a nut member of improved design and adaptable by reason of its features hereinabove set out for commercial usage.

Although I have illustrated and described a preferred embodiment of my invention, I do not wish to be limited thereby because the scope of my invention is best set out in the following claims.

I claim:

1. A nut device formed from an elongated strip of sheet metal and having a yieldable U-shaped shank capable of self-expansion after contraction and being in the form of a pair of legs joined at the bottom end, a flange extending outwardly from each of said legs at the top end of said shank, said shank having a number of thread convolutions on its inner surface to receive a screw and each leg having a rigid nut-holding portion extending transversely to the axis of said shank across the entire width of said respective leg, said nut-holding portions being spaced from the flanges to receive a support between the flanges and the nut-holding portions when the shank is passed through an aperture in the support.

2. A nut device applicable to a support having an aperture shaped to provide two opposed parallel straight edges, said nut device formed from an elongated strip of sheet metal and having a yieldable U-shaped shank capable of self-expansion after contraction and being in the form of a pair of legs joined at the bottom end, a flange extending outwardly from each of said legs at the top end of said shank, a portion of each of said legs being bowed in cross-section transverse to the axis of said shank from a point adjacent said bottom end forwardly a predetermined distance toward said flanges, each of said legs having a camming portion extending laterally outwardly from said forward end of said bowed portion and a shoulder portion extending inwardly from the outer end of said camming portion, said shoulder portions being substantially straight in transverse cross-section and spaced from the flanges to receive portions of said support adjacent opposed straight edges of said aperture between said flanges and said shoulders when the shank is passed through said aperture, and said legs having threads on their inner surfaces to receive a screw.

3. A nut device applicable to a support having an aperture shaped to provide two opposed parallel straight edges, said nut device formed from an elongated strip of sheet metal and having a yieldable U-shaped shank capable of self-expansion after contraction and being in the form of a pair of legs joined at the bottom end, a flange extending outwardly from each of said legs at the top end of said shank, a portion of each of said legs being bowed in cross-section transverse to the axis of said shank from a point adjacent said bottom end forwardly a predetermined distance toward said flanges, each of said legs having camming portions extending laterally outwardly from said forward end of said bowed portion and a shoulder portion extending inwardly from the outer end of said camming portion, said shoulder portions being substantially straight in transverse cross-section and spaced from the flanges to receive portions of said support adjacent said straight edges of said aperture between said flanges and said shoulders when the shank is passed through said aperture, said bowed portions of said legs being threaded on their inner surfaces to engage a screw received within said shank and said legs being threadless from the forward ends of said bowed portions to the top end of said shank.

4. A nut device applicable to a support having an aperture, said nut device being formed from sheet metal and having a U-shaped shank adapted to be extended through said aperture of said support, said shank being in the form of a pair of legs joined at the bottom end, support-engaging means at the top end of said shank, said shank being internally threaded to receive a screw, and said shank having a cup-shaped imperforate portion at its bottom end for the purpose described.

5. A nut device applicable to a support having an aperture, said nut device being formed from sheet metal and having a U-shaped shank adapted to be extended through said aperture of said support, said shank being in the form of a pair of legs joined at the bottom end, each of said legs having a portion of bowed cross-sectional shape, support-engaging means at the top end of said shank, said shank being internally threaded to receive a screw, and said shank having an imperforate substantially semi-spherical portion at its bottom end for the purpose described.

6. A nut device applicable to a support having an aperture, said nut device being formed from sheet metal and having a yieldable U-shaped shank adapted to be snapped through said aperture of said support, said shank being in the form of a pair of legs joined at the bottom end, a flange extending outwardly from each of said legs at the top end of said shank for engaging a surface of said support, said shank being internally threaded to receive a screw and each leg having a nut-holding portion and spaced from the flanges to receive said support between the flanges and the nut-holding portions when the shank is passed through said aperture of said support, and said shank having a cup-shaped portion of imperforate substantially semi-spherical form at its bottom end for the purpose described.

FRANK E. JOHNSON.